United States Patent [19]

DeFalco

[11] Patent Number: 4,532,973
[45] Date of Patent: Aug. 6, 1985

[54] OVERHEAD DOOR CONSTRUCTION

[76] Inventor: Ralph DeFalco, 10320 S. Kenneth, Oak Lawn, Ill. 60453

[21] Appl. No.: 504,445

[22] Filed: Jun. 15, 1983

[51] Int. Cl.³ ................................................ E06B 3/12
[52] U.S. Cl. ..................................... 160/235; 160/201
[58] Field of Search ................. 160/201, 209, 232, 235

[56] References Cited

U.S. PATENT DOCUMENTS

| | | | |
|---|---|---|---|
| 2,880,796 | 4/1959 | Stroup | 160/235 |
| 2,968,829 | 1/1961 | Meddick | 160/235 |
| 3,056,451 | 10/1962 | Federline et al. | 160/235 |
| 3,156,210 | 11/1964 | Lyon | 160/235 |
| 3,347,305 | 10/1967 | Urbanick | 160/201 |
| 3,415,304 | 12/1968 | Sawyer | 160/235 |
| 3,511,301 | 5/1970 | Graham et al. | 160/235 |

*Primary Examiner*—Peter M. Caun
*Attorney, Agent, or Firm*—Hill, Van Santen, Steadman & Simpson

[57] ABSTRACT

There is disclosed herein an upwardly acting overhead door which is adapted to be rolled along an L-shaped track between a substantially vertical closed position and a substantially horizontal storage position. The door includes a plurality of adjacent laterally-extending door panel sections in edge-to-edge arrangement and hinge sets for interconnecting adjacent panel sections along adjacent lateral edges.

Each of the hinge sets includes a male member and a female member. The male member is secured to the lower edge of the upper adjacent door section and the female member is secured to the upper edge of the lower of said adjacent door section. The male and female members define a hinge knuckle which interconnects the male and female members, and thus hingedly interconnects the door sections along the lateral edges thereof.

The members, which may be extrusions, define roller receiving sections within the hinge adjacent each side edge for removably receiving a roller-and-shaft assembly, shaft bearing sleeve, and a resilient, removable spacer member. By removing the spacer member, the sleeve bearing can be slid from or retracted from its bearing position, thereby permitting the removal of the roller-and-shaft assembly without dismantling the door.

16 Claims, 9 Drawing Figures

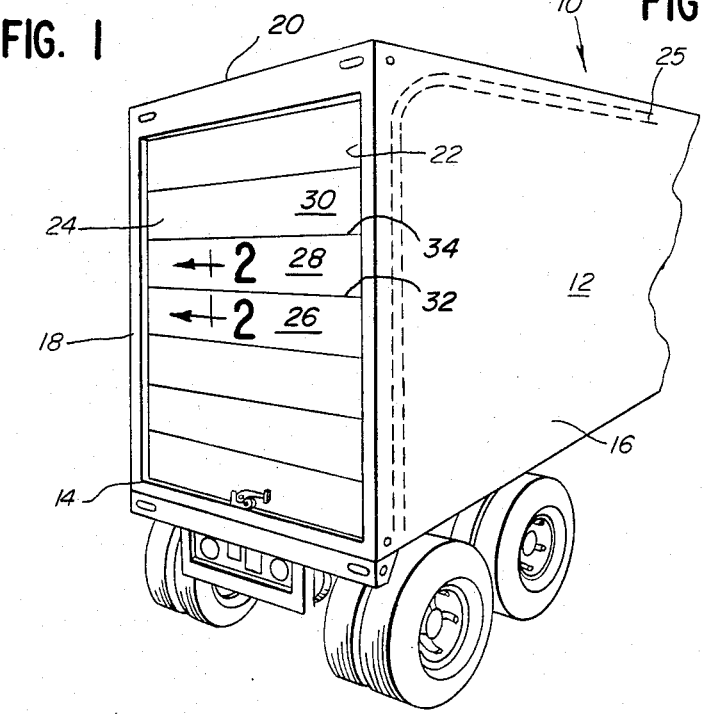
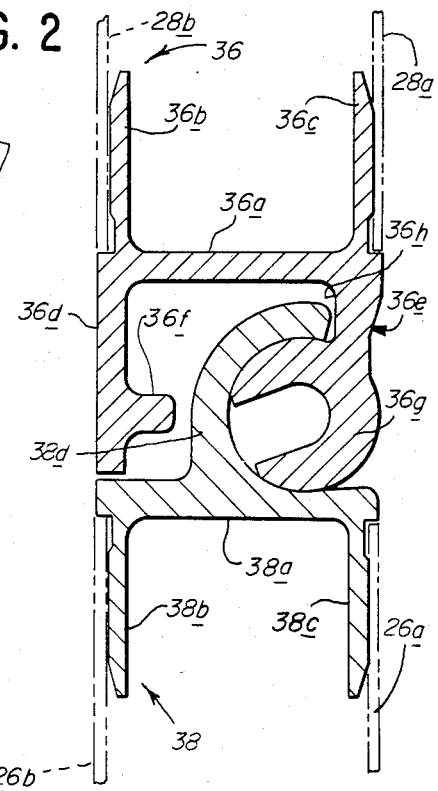
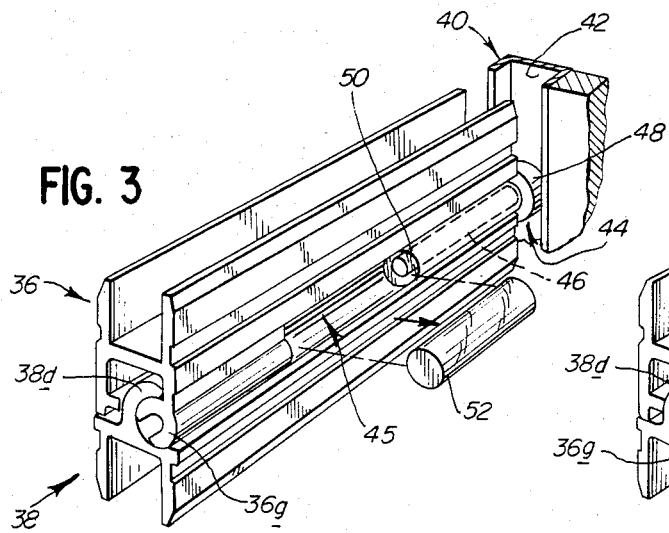
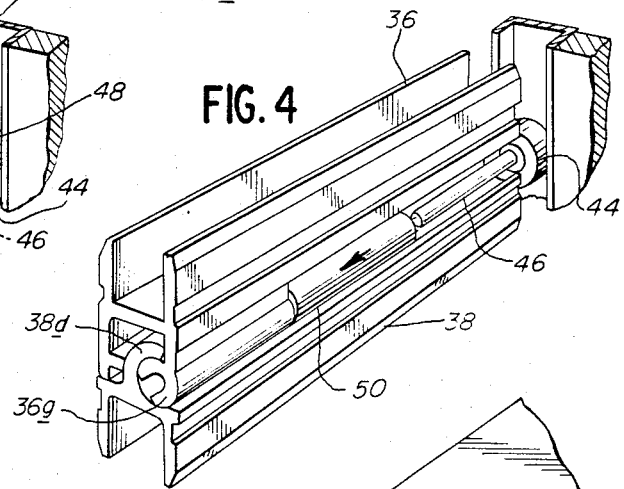
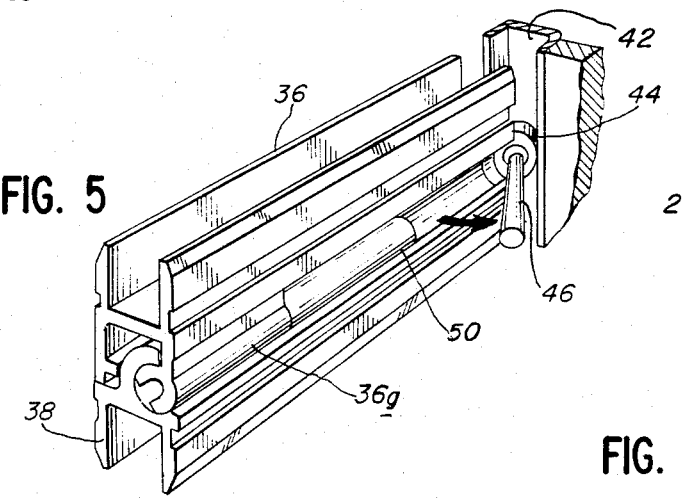
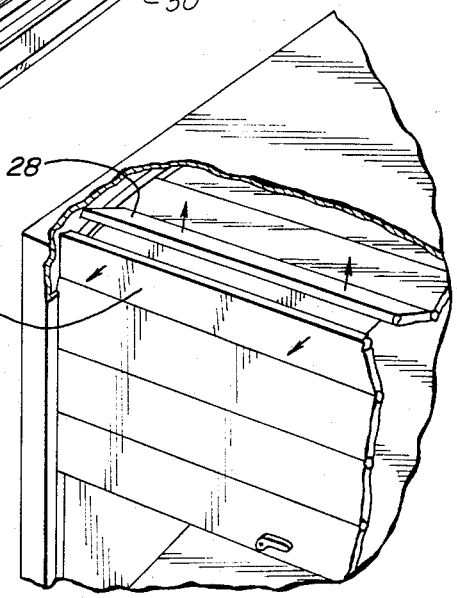

FIG. 8
FIG. 9
FLATS DISTANCE
FIG. 7
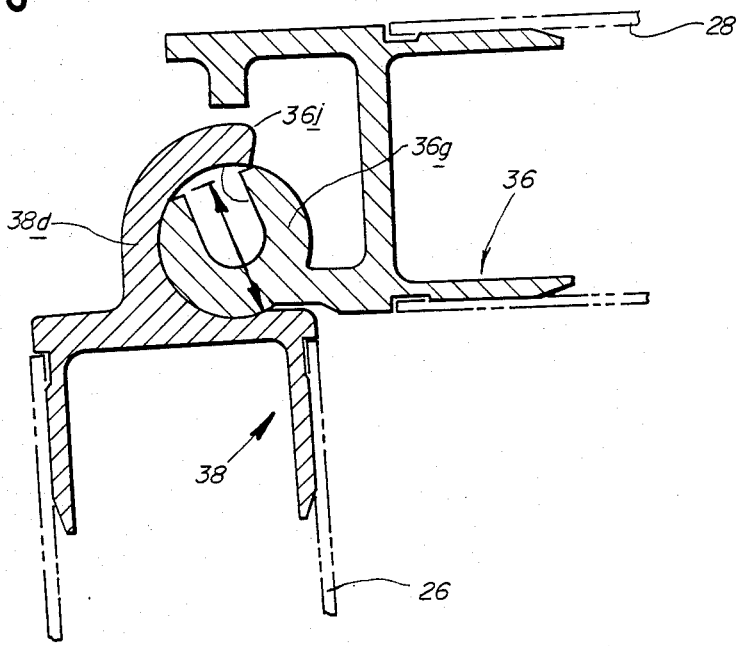
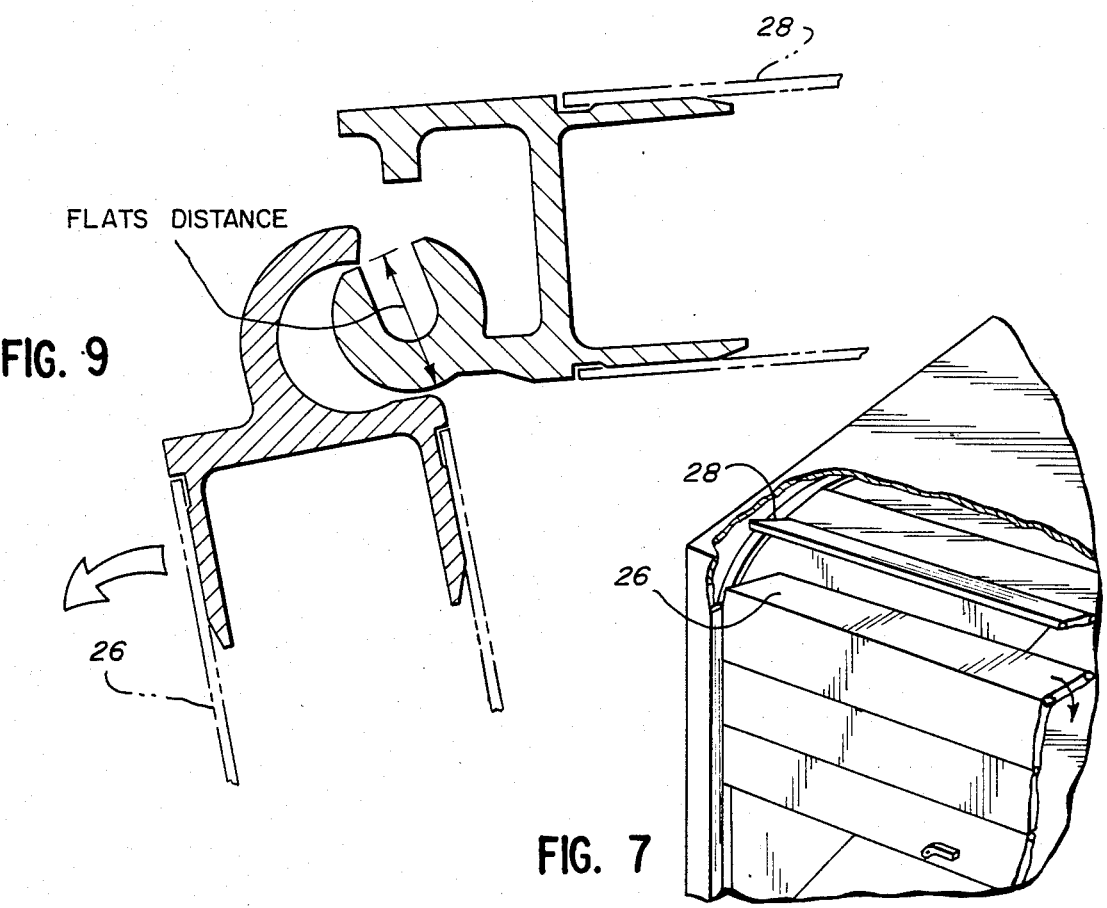

4,532,973

1

OVERHEAD DOOR CONSTRUCTION

BACKGROUND OF THE INVENTION

This invention relates to overhead doors, particularly the roll-up or upwardly-acting type which are used in truck trailers.

Overhead doors are commonly used as garage doors, at vehicle docking entrances and on cargo-carrying vehicles such as trucks, semi-trailers, and the like. Typically these doors are moved along an L-shaped track from a vertical door-closed position to an overhead horizontal door-open or storage position. In some situations these doors are one piece and thus swing as one piece from the closed position to the open position and back. However, doors which are constructed from a plurality of laterally-extending hinged sections have become popular. These doors usually include a biased spring-type operator which assists in the manual opening and closing of the door.

In the sectional doors, hinges join the sections to each other and roller assemblies, which are part of the hinge assembly, guide the door sections along the track as the door is moved between the closed and open positions. These hinge and roller assemblies protrude from the door surface.

Overhead Door Corporation of Dallas, Tex., U.S.A. and Whiting Roll-Up Door Mfg. Corp. of Akron, N.Y., U.S.A. are major manufacturers of such doors and each has patented various door constructions. Typical sectional doors, hinges and roller constructions are shown in patents such as U.S. Pat. Nos. 4,306,756; 4,205,713; 3,693,693; 3,227,205; 3,213,924;, 2,902,087; and 2,869,637.

In such door systems, it is occasionally necessary to remove a section, a hinge or a roller for repair or replacement. In existing doors the hinges are riveted to the sections, thus making it difficult to remove sections or hinges for replacement or repair. Removing riveted parts can be destructive, time-consuming and expensive. This is particularly a problem in the trucking and transportation industry where the entire vehicle is out of service while a door is being serviced.

It is therefore the primary object of this invention to provide a sectionalized, upwardly-acting door assembly in which the door sections, hinges and rollers can be efficiently removed, repaired or replaced without the removal of mechanical fasteners.

Furthermore, the fact that the hinges extend into the cargo area has resulted in the hinges catching or snagging on cartons and goods. Such snagging has resulted in damaged goods as well as jammed and/or damaged doors.

It is another object of this invention to provide a system in which the door, hinge or roller does not catch or snag on shipped goods.

Typically sectionalized overhead doors are made of wood, plastic-coated wood, aluminum-clad wood or metal sections, principally for strength and durability. However, in the trucking and transportation industry, such doors add weight to the vehicle decreasing fuel efficiency, as well as reducing regulation-defined cargo carrying capacity. Such doors are also heavy and thus difficult to service. As a result there has been a trend toward using lightweight hollow-core or foam-filled door sections.

It is therefore another object of this invention to provide a hinge construction which is suitable for use with lightweight door constructions.

These and other objects of this invention will become apparent from the following description and appended claims.

SUMMARY OF THE INVENTION

There is provided by this invention an upwardly-acting sectional overhead door assembly which includes a roller-retaining assembly that permits the roller or door section to be readily and efficiently removed which, in turn, permits the repair or replacement of hinges, door sections and rollers quickly and efficiently. In this assembly a shaft on which the roller is mounted is retained in position within a hinge that is integral with the door sections by a sleeve bearing which, in turn, is held in position by a flexible and deformable spacer. This hinge construction also provides a smooth interior surface for the door and thus minimizes snagging and jamming.

Furthermore, the hinge assembly may be extruded, is lightweight, cooperates with lightweight door sections and also defines a roller supporting and receiving chamber or section.

BRIEF DESCRIPTION OF THE DRAWINGS

FIG. 1 is a perspective view showing the rear portion of a trailer with an overhead door assembly;

FIG. 2 is a sectional view taken along line 2—2 of FIG. 1 showing an extruded hinge construction;

FIG. 3 is a perspective view showing the hinge construction with the roller in a guide track and the flexible spacer sleeve removed;

FIG. 4 is a perspective view similar to FIG. 3, but with the sleeve bearing slipped sideways or retracted so as to expose the roller shaft;

FIG. 5 is a perspective view like FIG. 4 showing the roller assembly pivoted for removal;

FIGS. 6 and 7 show opening of the door for separation of hinge sections and removal;

FIG. 8 shows the hinge sections at the point of turning and for separation; and

FIG. 9 shows separation of the hinge parts.

DESCRIPTION OF THE PREFERRED EMBODIMENT

Referring now to FIG. 1, there is shown a trailer 10 generally, which includes a body 12 that has a floor 14, side walls 16 and 18 and top wall 20, which define a rear door opening 22.

The overhead door 24 is of the upwardly-acting sectional type which is raised by rolling along an L-shaped track, such as 25, provided in the sides and along the ceiling of the trailer. The door 24 includes a plurality of laterally extending sections or panels, such as 26, 28 and 30, which are joined together along the lateral hinge lines, such as 32 and 34. When the door is raised, it bends or turns at the hinge lines so as to assume a storage position adjacent the ceiling or top wall 20.

In this construction the sections or panels, such as 26, 28 and 30, are of the lightweight honeycomb or foam-filled types, but it will be appreciated that aluminum, metal or wood constructions can be used.

Referring now to FIG. 2, the male and female, or upper and lower hinge extrusions, 36 and 38, are shown. The inner faces of the panels are identified as 28a and 26a and outer faces 28b and 26b. It will be noted that the interior surface is smooth, and thus minimizes snagging of cartons or jamming of the door.

The top extrusion 36 includes a central web 36a, which along with offset and upstanding panel-engaging flanges 36b and 36c, define an upwardly open channel. Depending upon the door section construction, the flanges either fit within the panel as shown or the panel fits between the flanges. In either case, the section or panel is secured to the panel-engaging flanges.

A depending front stop flange 36d depends from the web 36a as does the rear, male, hinge-knuckle-carrying-flange 36e. The terminal or lower end of the front flange 36d provides a hinge stop which defines a limit of outward rotation (i.e., counterclockwise rotation) for the hinge. The inwardly-extending finger 36f provides a guiding function.

The hinge knuckle flange 36e terminates in a downwardly spaced, outwardly-extending and outwardly-opening C-shaped knuckle member 36g. Inwardly and outwardly refer to the direction—inwardly or toward the truck interior and outwardly or toward the outside of the truck. The flange portion between the knuckle 36g and web 36a defines a connecting web 36h. It will be noted that the knuckle 36g is substantially cylindrical and circular in section, except across the opening.

The lower or female hinge section 38 also includes a central web 38a and a pair of depending panel-engaging flanges 38b and 38c which function to connect the lower hinge section to the panel 26 in the same manner as the upper hinge flanges 36b and 36c. An upstanding inwardly-opening crescent-shaped knuckle-receiving member 38d extends upwardly from the web 38a for complementary pivotal connection to the knuckle 36g. The terminal end of the crescent-shaped section 38d may act as a stop and abut the web 36h.

It will be appreciated that with this construction the upper and lower parts can pivot with respect to each other about the knuckle 36g. This permits the panel sections to turn from the vertical closed position to the horizontal storage position and back. Thus the top member 36 can rotate clockwise about 90° to a horizontal position without disconnecting.

However, rotation past about 90° will result in the top and bottom members separating from each other. The separation is governed by the positioning of the opening in the C-shaped knuckle 36g, the arc of the crescent-shaped member 38d and the positioning of its terminal end as well as the construction of the door track.

With this construction the hinge is protected from foreign material which could build up inside the hinge. For example, in cold weather entry of ice and snow is minimized by the downwardly extending flange 36d. If the members were reversed, foreign matter might enter the hinge and adversely affect operation.

Roller Removal

Turning now to FIG. 3, the top and bottom members 36 and 38 are shown, along with the right-hand track assembly 40, roller channel 42 and roller assembly 44. It should be noted that at the end sections the knuckle 36g is terminated laterally of the side edge of the extrusion so as to leave a roller-assembly receiving space or chamber 45 in the crescent-shaped member 38d, between the door side edge and knuckle edge. The roller assembly includes a roller shaft 46 of lesser diameter than the crescent-shaped member, and carries a wheel or roller 48. The sleeve bearing 50 fits over the shaft 46 and fits within and is retained within the crescent-shaped knuckle-receiving element 38d. A flexible retainer or spacing element 52 fits within the space 45 between the knuckle end and shaft end so as to retain the sleeve bearing in position.

When it is necessary to repair or replace a roller or remove the roller, the flexible retainer 52 is pried or popped from its position as shown in FIG. 3. The sleeve bearing 50 is slid or retracted laterally to one side so as to expose the roller shaft 46 as shown in FIG. 4. Thereafter, the roller shaft 46 is rotated out of the crescent-shaped section and removed, thus permitting the roller 48 to be removed from the channel 42 for repair or replacement. In order to replace the roller, the above procedure is reversed.

Thus the roller can be removed and replaced without disassembling or destroying the door.

Section Removal

In order to remove a door section, the rollers at the upper ends of that door section are removed from each end and the door raised to the turning point. At this point the flats on the C-shaped knuckle section 36g and crescent-shaped member 38d can be separated and, thereafter, the lower hinge separated. Thus a damaged section can be removed and replaced quickly and efficiently.

More specifically, the door is brought to the top of the trailer where the hinge sections align as shown in FIGS. 8 and 9. There the upper panel 28 is horizontal, the lower panel 26 is vertical, and the extrusions 36 and 38 are also horizontal and vertical, respectively. As is seen from FIG. 8, the knuckle openings 36j is positioned at the terminal edge of the crescent-shaped member 38d. At this point the C-shaped knuckle will not clear the crescent-shaped member. However, at this point a small amount of additional rotation permits separation of the hinge elements.

Geometrically, the C-shaped knuckle 36g has a diameter of about 0.490 inches and the distance through the center of the knuckle slot from the periphery to a line across the opening or flats is about 0.465 inch. The crescent-shaped member 38d has a diameter of about 0.518 and the dimension across its opening is less than 0.518 inch (crescent section diameter), but greater than 0.465 inch, the flats distance. This permits the knuckle to be removed from the crescent when the flats distance is aligned with the crescent opening.

Thus when the knuckle 36g and crescent member 38d are rotated so that the flats distance and crescent opening are parallel or aligned, the knuckle 36g can be removed from the crescent member 38d so as to open the hinge. Closure is the reverse process.

Thereafter, the top unhinged portion of the lateral panel is rotated downwardly and toward the inside of the truck, thus loosening the lower end of the hinge and thereby permitting complete separation of the panel section as shown in FIG. 7.

A new panel section can be replaced in the reverse manner.

It will be appreciated that these and other changes and modifications can be made to the embodiment shown herein without departing from the spirit and scope of this invention.

What is claimed and desired to be secured by Letters Patent of the United States is:

1. An upwardly acting overhead door which is adapted to be rolled along an L-shaped track between a substantially vertical closed position and a substantially horizontal storage position, said door having an outer face and an inner face, and said door including:
- a plurality of adjacent laterally-extending door panel sections in edge-to-edge arrangement; and
- hinge means sets for interconnecting adjacent panel sections along adjacent lateral edges thereof; wherein the improvement comprises:
- each of said hinge means sets comprising a male member and a female member positioned between the side edges of said panels and between the inner and outer faces;
- one of said male and female members being secured to the lower edge of the upper of the adjacent door sections and the other of said male and female members being secured to the upper edge of the lower of said adjacent door sections;
- said male and female members defining separable hinge knuckle means which interconnect so as to hingedly interconnect the door sections along the lateral edges of said door sections;
- said hinge means defining a door roller assembly receiving section at each lateral edge; said section being formed by the outboard end of the female member and an inwardly spaced terminal end of the male member;
- wherein said inner door face is substantially smooth so as to minimize snagging of said door; and
- wherein there is further provided a plurality of roller assembly means, each adapted for mounting in said door roller receiving section, each of said roller assembly means including a shaft having a roller mounted thereon, said shaft being of a length less than the distance between the door's lateral edge and the inwardly spaced terminal end of said male member, a bearing sleeve constructed to fit within and be retained within said female member and being of a length substantially equal to that of the shaft and removable retainer means constructed to fit between said male member's terminal end and sleeve bearing and shaft to maintain the shaft and bearing sleeve in place during use.

2. A door as in claim 1, wherein said male and female hinge members extend substantially the entire lateral dimension of the door section between the side edges.

3. A door as in claim 1, wherein each of the male and female members are extrusions.

4. A door as in claim 1, wherein said roller shaft is aligned with the pivot axis of the hinge means.

5. A door as in claim 1, wherein:
- individual panels of the door are separable and selectively removable from said door:
- by removal of each of the roller means associated with said panel and
- by selective positioning of the panel to be removed and adjacent panels at attitudes wherein the male and female hinge members are separable.

6. A door as in claim 5, wherein:
- each of said roller means is removable by removal of the retainer means, removing the bearing means from the shaft means and moving the shaft means out of engagement with the door roller assembly receiving section; and
- said hinge members being separable by moving the panel to be removed to an attitude of approximately right angles to an adjacent panel so as to separate the male and female hinge member means.

7. A door as in claim 1, wherein:
- said male member is secured to the lower edge of the upper adjacent door section; and
- said female member is secured to the upper edge of the lower adjacent door section.

8. A door as in claim 7, wherein said male member includes an outer downwardly depending flange having a terminal end constructed to act as a stop to prevent undesired rotation of said hinge.

9. A door as in claim 7, wherein said male member includes a depending flange which terminates in a C-shaped knuckle member and said female member includes an upstanding crescent-shaped knuckle-receiving member for complementarily receiving said C-shaped member for pivotal hinge connection.

10. A door as in claim 9, wherein said male member includes a central lateral web and said C-shaped knuckle carrying flange extends downwardly therefrom along an inner edge thereof, and said female member includes a central lateral web and said crescent-shaped member extends upwardly from the center thereof.

11. A door as in claim 9, wherein said C-shaped knuckle opens toward said crescent-shaped member and said crescent-shaped member opens toward the inner face and wherein the openings in both the C-shaped knuckle member and crescent-shaped member are shaped and constructed to permit separation of the parts only after relative rotation when the flats of the C-shaped member and opening of the crescent-shaped member are aligned.

12. A door as in claim 11, wherein the diameter of the C-shaped member is greater than the dimension of the crescent member opening but less than the crescent member diameter, and where the flats dimension of the C-shaped member is less than the dimension of the opening of the crescent-shaped member.

13. A door as in claim 11, wherein separation is achieved after relative rotation of about 90°.

14. A door as in claim 9, wherein said door-roller assembly receiving section is defined by a crescent-shaped female member, the outboard lateral edge of said member and the inwardly spaced terminal end of said C-shaped knuckle member.

15. An upwardly acting overhead door which is adapted to be rolled along an L-shaped track between a substantially vertical closed position and a substantially horizontal storage position, wherein said door includes:
- a plurality of adjacent laterally-extending door panel sections in edge-to-edge arrangement; and
- hinge means sets for interconnecting adjacent panel sections along adjacent lateral edges thereof; wherein the improvement comprises:
- each of said hinge means sets comprising a male member and a female member positioned between the side edges of said panels;
- said male member being secured to the lower edge of the upper of the adjacent door sections and the female member being secured to the upper edge of the lower of said adjacent door sections;
- said male and female member defining separable hinge knuckle means which interconnect so as to hingedly interconnect the door sections along the lateral edges of said door sections;
- said male member including a depending flange which terminates in a C-shaped knuckle member and said female member including an upstanding crescent-shaped knuckle-receiving member for complementarily receving said C-shaped member for pivotal hinge connection;

said hinge means defining a door roller assembly receiving section at each lateral edge thereof, said section being formed by the crescent-shaped female member, the outboard lateral edge of said female member, and the inwardly spaced terminal end of said C-shaped knuckle member; and wherein there is further provided a plurality of roller assembly means, each adapted for mounting in a door roller receiving section, each of said roller means including a shaft having a roller mounted thereon, said shaft being of a length less than the distance between the door's lateral edge and said C-shaped knuckle terminal end, a bearing sleeve constructed to fit within and be retained within said crescent-shaped female member and being of a length substantially equal to that of the shaft, and removable retainer means constructed to fit between said C-shaped knuckle terminal end and sleeve bearing and shaft to maintain the shaft and bearing in place during use.

16. A door as in claim 15, wherein said retainer is a resilient plastic spacer member adapted for manipulation into and out of said space.

* * * * *